United States Patent
Gargaro et al.

(10) Patent No.: US 12,401,601 B2
(45) Date of Patent: Aug. 26, 2025

(54) RECERTIFICATION OF ACCESS CONTROL INFORMATION BASED ON CONTEXT INFORMATION ESTIMATED FROM NETWORK TRAFFIC

(71) Applicant: INTERNATIONAL BUSINESS MACHINES CORPORATION, Armonk, NY (US)

(72) Inventors: Gianluca Gargaro, Rome (IT); Raffaele Giulio Sperandeo, Marcianise (IT); Luigi Lombardi, Naples (IT); Davide Fazzone, Baiano (IT)

(73) Assignee: International Business Machines Corporation, Armonk, NY (US)

( * ) Notice: Subject to any disclaimer, the term of this patent is extended or adjusted under 35 U.S.C. 154(b) by 704 days.

(21) Appl. No.: 17/643,847

(22) Filed: Dec. 13, 2021

(65) Prior Publication Data

US 2023/0188471 A1    Jun. 15, 2023

(51) Int. Cl.
*H04L 47/2483* (2022.01)
*H04L 43/04* (2022.01)
(Continued)

(52) U.S. Cl.
CPC .......... *H04L 47/2483* (2013.01); *H04L 43/04* (2013.01); *H04L 43/062* (2013.01); *H04L 47/20* (2013.01); *H04L 47/803* (2013.01)

(58) Field of Classification Search
CPC ... H04L 47/2483; H04L 43/04; H04L 43/062; H04L 47/20; H04L 47/803; H04L 41/142; H04L 41/16; H04L 43/08
See application file for complete search history.

(56) References Cited

U.S. PATENT DOCUMENTS 9,356,829 B1 * 5/2016 Zeldin ................. H04L 41/5074
10,104,077 B1   10/2018 Irwan
(Continued)

FOREIGN PATENT DOCUMENTS

RU       2677378 C2   1/2019
WO    2023/111827 A1   6/2023

OTHER PUBLICATIONS

NPL1 (Downdetector, "Downdetector Methodology" retrieved from wayback machine screenshot Dec. 6, 2021 from https://web.archive.org/web/20211206061504/https://downdetector.com/methodology/; hereinafter NPL1) (Year: 2021).*
(Continued)

*Primary Examiner* — Michael A Keller
(74) *Attorney, Agent, or Firm* — Heather Johnston

(57) ABSTRACT

The present disclosure relates to facilitating a recertification of access control information. A corresponding method comprises collecting network traffic information relating to a network. Context information is estimated from the network traffic information for accesses to the software application relating to invocations over the network of services contributing (at least in part) to implement the software application. For example, the context information is estimated by an estimation engine that is configured incrementally during a migration of the software application from a module architecture to a service architecture (according to the network traffic information and to corresponding log information). A computer program and a computer program product for performing the method are also proposed. Moreover, a system for implementing the method is proposed.

20 Claims, 9 Drawing Sheets

(51) Int. Cl.
*H04L 43/062* (2022.01)
*H04L 47/20* (2022.01)
*H04L 47/80* (2022.01)

(56) References Cited

U.S. PATENT DOCUMENTS

| | | | |
|---|---|---|---|
| 10,243,994 B2 | 3/2019 | Matthiesen | |
| 10,298,605 B2 | 5/2019 | Chen | |
| 10,440,029 B2 | 10/2019 | Hidden | |
| 10,798,084 B1 | 10/2020 | Rose | |
| 2014/0283083 A1 | 9/2014 | Gula | |
| 2017/0134405 A1 | 5/2017 | Ahmadzadeh | |
| 2017/0201505 A1* | 7/2017 | Dharmarajan | H04L 63/104 |
| 2018/0005277 A1* | 1/2018 | Shinkuma | G06Q 30/0261 |
| 2018/0034832 A1* | 2/2018 | Ahuja | H04L 67/51 |
| 2018/0136931 A1* | 5/2018 | Hendrich | G06F 11/30 |
| 2018/0159852 A1* | 6/2018 | Crabtree | H04L 43/04 |
| 2019/0057015 A1* | 2/2019 | Hassan | G06F 11/008 |
| 2019/0245856 A1 | 8/2019 | Irwan | |
| 2020/0106781 A1 | 4/2020 | Li | |
| 2020/0341789 A1* | 10/2020 | Ghag | H04L 43/0876 |
| 2020/0351286 A1* | 11/2020 | Ahuja | G06F 9/45558 |
| 2020/0351306 A1* | 11/2020 | Nedbal | H04L 63/20 |
| 2020/0364035 A1* | 11/2020 | White | G06F 9/547 |
| 2020/0365185 A1* | 11/2020 | Vittal | G11B 27/102 |
| 2020/0366756 A1* | 11/2020 | Vittal | H04L 67/75 |
| 2021/0021643 A1* | 1/2021 | Nakagoe | H04L 67/34 |
| 2021/0099494 A1 | 4/2021 | Kuehr-Mclaren | |

OTHER PUBLICATIONS

Buber, "Botnet Detection with ML", https://medium.com/@EbubekirBbr/botnet-detection-with-ml-afd4fa563d31, Mar. 23, 2018, pp. 1-13.

Caprolu et al., "Cryptomining Makes Noise: a Machine Learning Approach for Cryptojacking Detection", arXiv:1910.09272v2 [cs.CR] Jan. 28, 2020, pp. 1-16.

Disclosed Anonymously, "Enhanced Recertification Decision", IPCOM000250255D, IP.com No. IPCOM000250255D, Jun. 19, 2017, pp. 1-4.

Mell et al., "The NIST Definition of Cloud Computing", National Institute of Standards and Technology, Special Publication 800-145, Sep. 2011, pp. 1-7.

International Search Report and Written Opinion, International Application No. PCT/IB2022/062088, International Filing Date Dec. 12, 2022.

* cited by examiner

RECERTIFICATION OF ACCESS CONTROL INFORMATION BASED ON CONTEXT INFORMATION ESTIMATED FROM NETWORK TRAFFIC

BACKGROUND

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

The present disclosure relates to the information technology field. More specifically, this disclosure relates to recertification of access control information based on context information estimated from network traffic.

Controlling access to an Information Technology (IT) system is a key practice in its governance. In general terms, this relates to a process used to restrict access selectively to resources of the information technology system, for example, via a software application. The access control process is used to permit/prohibit activities that may be performed on the resources (commonly referred to as objects) by different entities, for example, (human) users (commonly referred to as subjects). The access control process is aimed at enabling the (right) subjects to perform the (right) activities at right times and for right reasons; this avoids (or at least significantly reduces) the risk that unauthorized subjects might perform undesired (and generally dangerous) activities. All of the above is very important to guarantee good security level and statutory law compliance.

The access control process is implemented by a corresponding access control system, for example, based on an Identity and Access Management (IAM) application. In general, the access control system associates each subject with a digital identity (such as via account and password for a log-in to the software application). The access control system then enforces the access to the objects by the subjects according to access control information, which defines entitlements of the subjects to perform specific activities on specific objects (for example, defined by roles assigned to the subjects in an RBAC model or defined by rules based on attributes in an ABAC model).

In this context, recertifications of the access control information are commonplace; each recertification involves validating and possibly updating the access control information for ensuring that the entitlements of the subjects are always appropriate (especially in highly dynamic environments); for example, this happens during recertification campaigns that are triggered by corresponding policies.

For this purpose, context information relating to the accesses to the objects by the subjects (for example, indicative of type of the subjects, type of the objects, activities performed thereon) is determined to support a (security) supervisor, or more, in deciding whether to approve or revoke the corresponding entitlements; this allows the supervisor to take well-informed and substantiated decisions (thereby reducing the risk of security exposures and facilitating compliance to audit requirements). The context information is determined from the software application, such as by extracting it from corresponding log information.

The log information is commonly available when the software application has a monolithic architecture in which the application writes its own log or converges the log information to a centralized log server. The log information may be retrieved from a service provider offering the software application as a service (either on-premises or in a cloud environment) when the same service provider also implements the corresponding access control system.

However, the context information is difficult (if not impossible) to determine in other situations.

For example, this difficulty happens during a migration of the software application from a monolithic architecture to a service architecture. In fact, a de facto standard process of the migration is based on a "strangler" pattern, wherein different modules of the software application are incrementally replaced by corresponding groups of services (such as micro-services) providing the same functionalities. For this purpose, when the micro-services corresponding to each module are ready, both the module and the micro-services may co-exist to allow testing the micro-services. Once the micro-services have been successfully tested, the module is decommissioned. As a result, the software application shrinks over time up to when all its functionalities are implemented by micro-services. However, before the module is decommissioned, a mix of modules and micro-services exists which hinders the collection of the log information.

In addition or in alternative, the same difficulty can happen when the software application is implemented in a cloud environment. In this case, it may be difficult to collect the log information, since it may be not available internally any longer.

This difficulty is exacerbated in the case of a multi-cloud environment, wherein the micro-services are implemented by different cloud providers. In fact, no single well-defined cloud provider exists that may collect the log information. Therefore, even when different pieces of the log information may be collected from the cloud providers, their correlation is very challenging.

SUMMARY

A summary of the present disclosure is herein presented in order to provide a basic understanding thereof. However, the sole purpose of this summary is to introduce basic concepts of the disclosure in a simplified form as a prelude to its following more detailed description, and it is not to be interpreted as an identification of its key elements nor as a delineation of its scope.

In general terms, the present disclosure is based on the idea of estimating the context information from network traffic information.

An embodiment of the disclosure provides a method for facilitating a recertification of access control information. The method comprises collecting network traffic information relating to a network. Context information is estimated from the network traffic information for accesses to the software application relating to invocations over the network of services contributing (at least in part) to implement the software application.

In another embodiment of the disclosure, the context information is estimated by an estimation engine that is configured incrementally during a migration of the software application from a module architecture to a service architecture (according to the network traffic information and corresponding log information).

A further aspect provides a computer program for implementing the method.

A further aspect provides a corresponding computer program product.

A further aspect provides a system for implementing the method.

BRIEF DESCRIPTION OF THE SEVERAL VIEWS OF THE DRAWINGS

The present disclosure, as well as further features and the advantages thereof, will be best understood with reference to the following detailed description given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation).

DETAILED DESCRIPTION

With reference to FIG. 1A-FIG. 1F, the general principles are shown of an embodiment of the present disclosure.

Figure 1A:
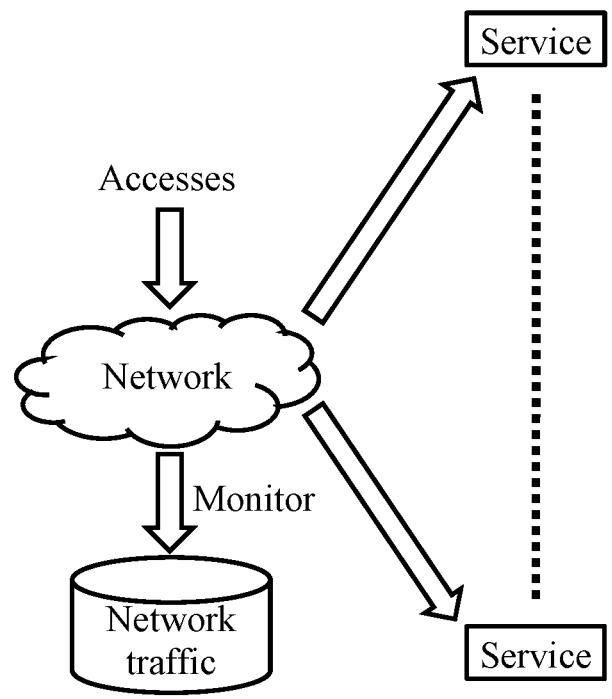
FIG. 1A-FIG. 1F show the general principles of the recertification of access control information based on context information estimated from network traffic according to an embodiment of the present disclosure.

Starting from FIG. 1A, an access control process is implemented to control access to objects (resources of an information technology system) by subjects (for example, users operating in the information technology system via corresponding digital identities). For this purpose, the access control system leverages corresponding access control information; the access control information defines entitlements of the users to perform activities on the resources (for example, roles assigned to the users in an RBAC model or rules based on attributes in an ABAC model). The resources are any hardware and/or software components of the information technology system needing to be protected (for example, files, databases, web pages, devices, machines and so on). The resources are accessed via a software application (or more), which restricts accesses to the resources by the users selectively, in response to corresponding (access) requests submitted by the users to the software application.

The software application has a service architecture, at least in part. In this case, the functionalities of the software application (contributing to obtain its complete function) are implemented, at least in part, by corresponding services that are invoked over a telecommunication network, for example, micro-services in a cloud environment. Examples of the functionalities of the software application are Customer Relationship Management (CRM), e-mail server, Lightweight Directory Access Protocol (LDAP), Security Information and Event Management (STEM), and so on. In the instant embodiment of the present disclosure, network traffic information is collected by monitoring a network traffic of the users over the telecommunication network.

Figure 1B:
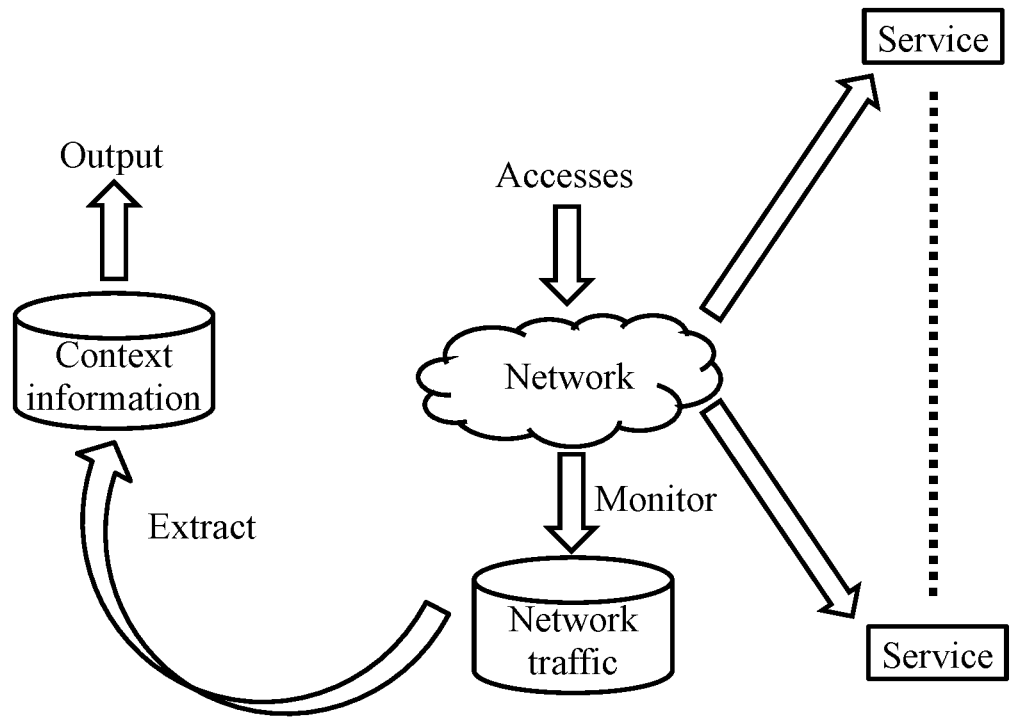

Moving to FIG. 1B, at any point in time the access control information may be subject to a recertification (such as in case of a recertification campaign). For this purpose, context information relating to the accesses to the software application by the users is determined. The context information is output (for example, displayed) to a (security) supervisor, or more, being entrusted to approve/revoke the entitlements of the users for supporting the decision-making process. According to an embodiment of the present disclosure, the context information is estimated, at least in part, from the network traffic information (for example, by a machine learning engine suitably trained for this purpose).

The above-described embodiment allows the context information to be determined in a very simple and effective way. This is possible even during a migration of the software application from another implementation (when a mix of different implementations of its functionalities exists). Moreover, this is also possible when the software application is implemented in a cloud environment, such as in the case of a multi-cloud environment (wherein the micro-services are spread throughout different cloud providers).

The context information is estimated from the network traffic information that is available internally, irrespective of the architecture of the software application. Therefore, no input is required from the outside, even when the software application is implemented externally (in part or entirely), such as in a cloud environment.

Figure 1C:
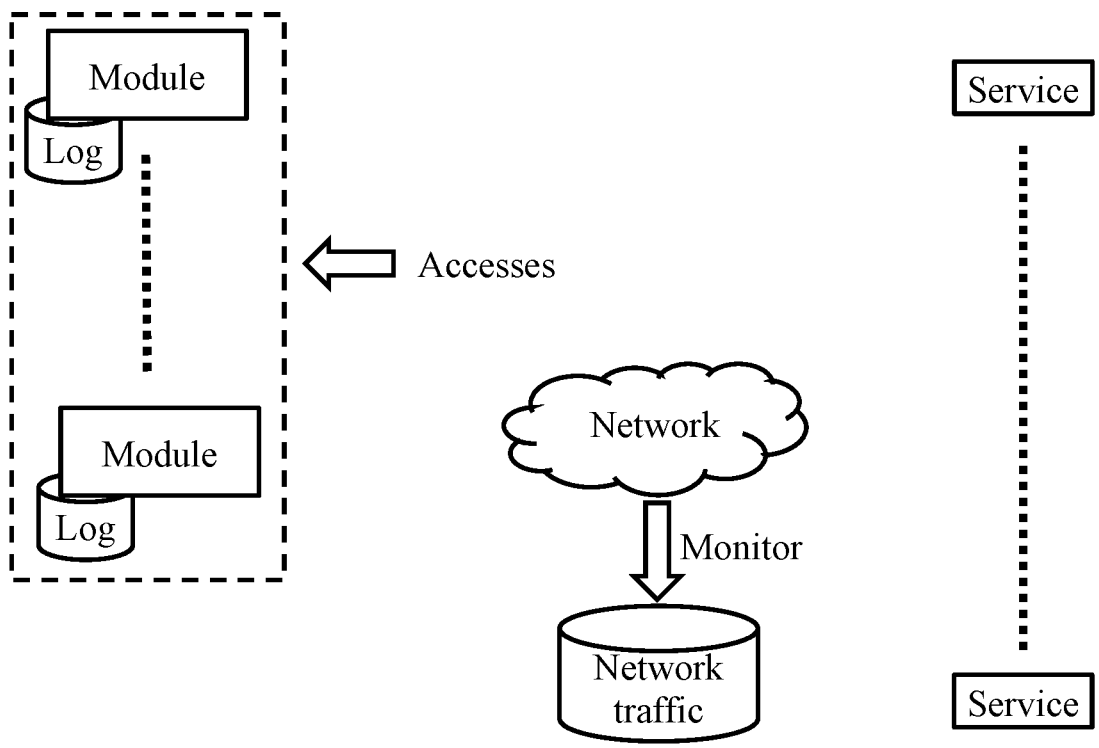

Moving to FIG. 1C, in a specific implementation, the software application is migrated to the (target) service architecture from a (source) monolithic architecture. In the monolithic architecture, the software application is implemented in a self-contained and independent way for providing its function, for example, on a single hardware/software platform. The functionalities of the software application are provided by corresponding (tightly-coupled) modules (for example, each comprising one or more software programs, routines, objects and so on). In a typical scenario, the software application is a legacy application supporting most activities of a company, with the modules (such as implementing the above-mentioned functionalities of CRM, e-mail server, LDAP, SIEM and so on) that run on-premises (such as in a same data center of the company). The modules save corresponding log information (either individually or collectively) relating to their operation.

Figure 1D:
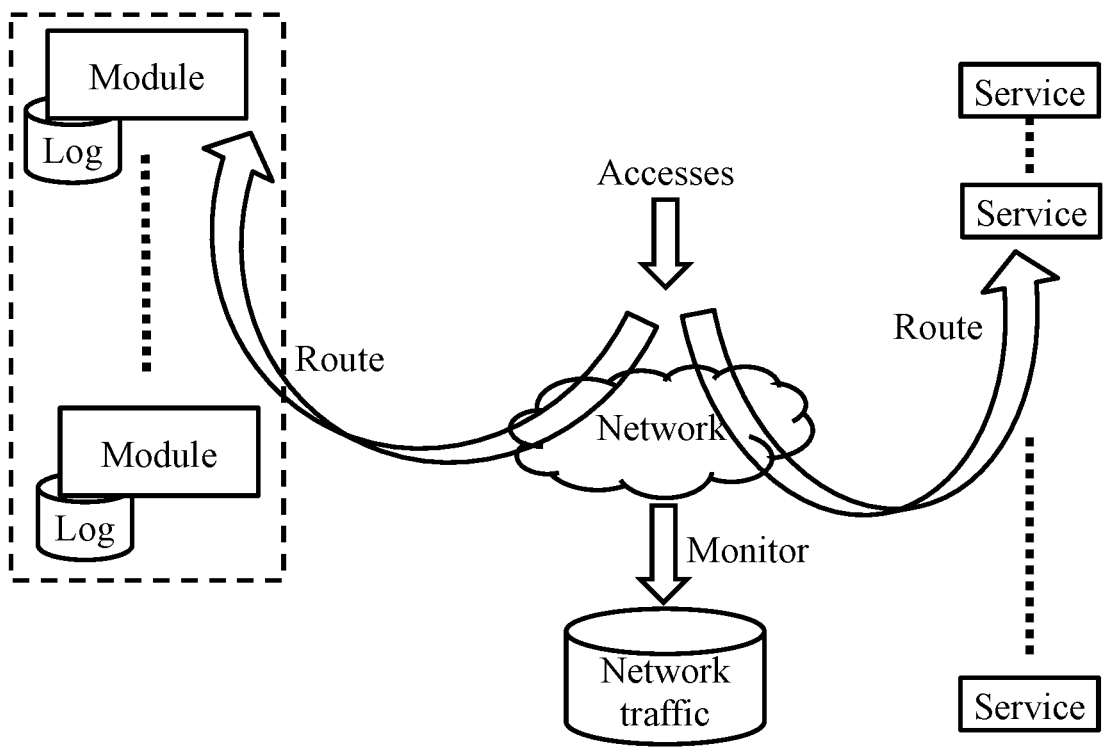

Moving to FIG. 1D, the migration of the software application is typically performed with a "strangler" pattern, by incrementally replacing each module with a corresponding group of micro-services providing the same functionality. In each migration phase, once the micro-services corresponding to a module have been developed they are made to co-exist (by routing the accesses to the software application for the corresponding functionality to both the micro-services and the module), in order to test the micro-services on the field.

Figure 1E:
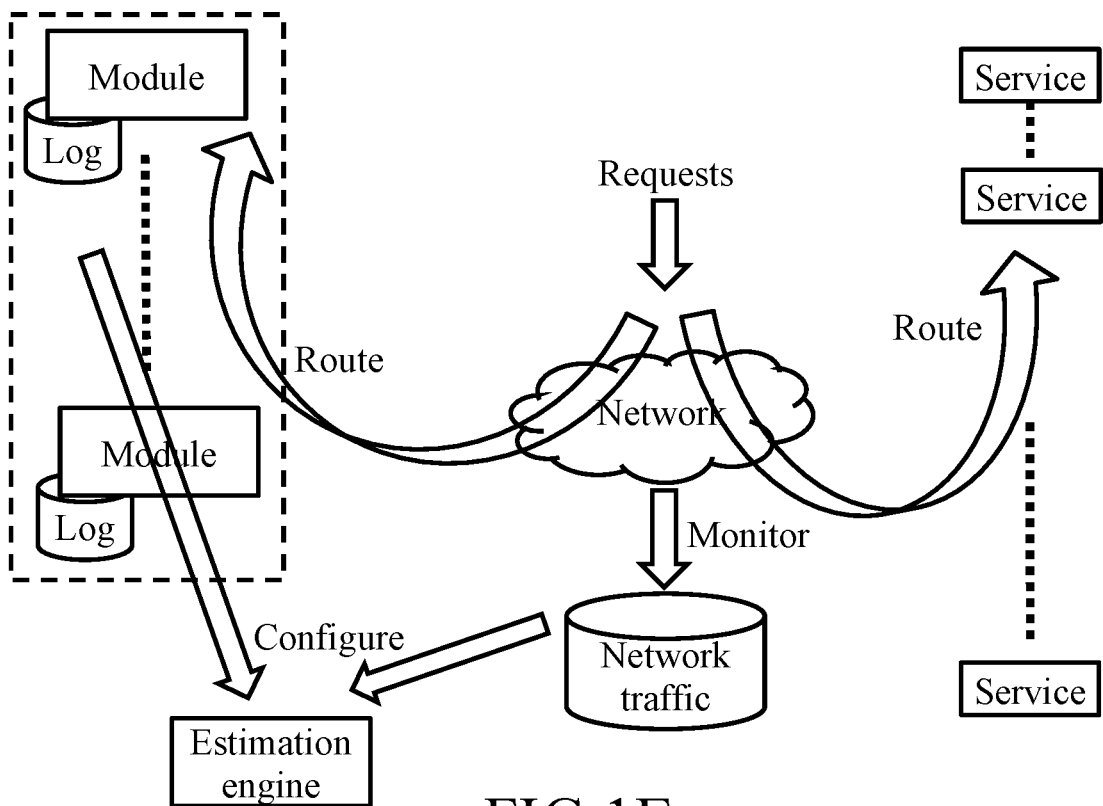

Moving to FIG. 1E, an estimation engine for estimating the context information from the network traffic information (for example, a machine learning engine) is configured during the migration of the software application. When the software application is migrated with the strangler pattern, this operation as well is performed incrementally. For this purpose, once a group of micro-services is ready to replace the corresponding module after the (successful) test thereof, the estimation engine is configured according to the log information of the module and to the network traffic information relating to the co-existence of the module with the micro-services (for example, by collecting training sets from the log information relating to the accesses to the module and the corresponding network traffic information for training the estimation engine).

Figure 1F:
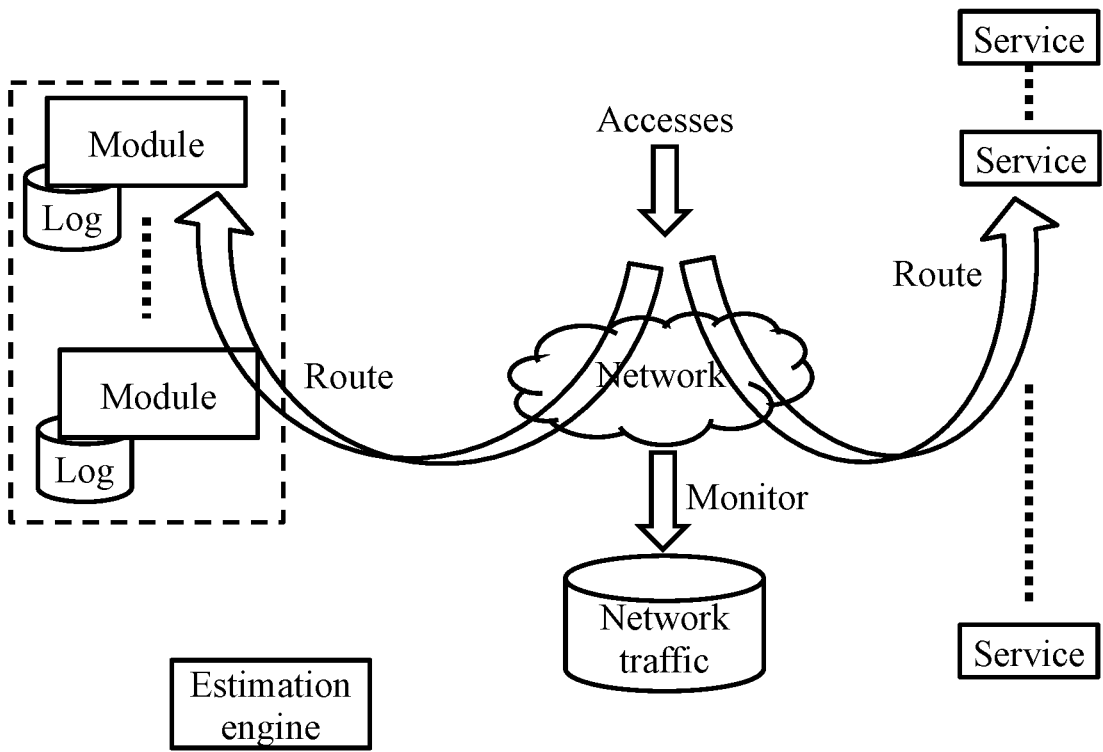

Moving to FIG. 1F, from now on the accesses to the software application for the corresponding functionality are routed to the micro-services only, so that the module may be decommissioned. The same operations are then performed for the other modules in succession with the software application that thus shrinks up to when all its modules have been replaced by the corresponding groups of micro-services implementing its whole function. As a result, the estimation engine refines accordingly, up to obtain its (complete) version for use when the software application is entirely based on the service architecture.

In this way, the training sets for configuring the estimation engine are generated automatically during the migration of the software application from the (concurrent) log information and network traffic information. This significantly reduces the effort required to collect the training sets. Moreover, a high number of training sets may be obtained thereby significantly improving an accuracy of the estimation engine. When the estimation engine is configured incrementally for the different migration phases, the operation is split accordingly into corresponding (configuration) phases. A complexity of each configuration phase is then reduced accordingly. This makes each configuration phase easier to manage (with a beneficial effect on the accuracy of the whole estimation engine).

Figure 2:
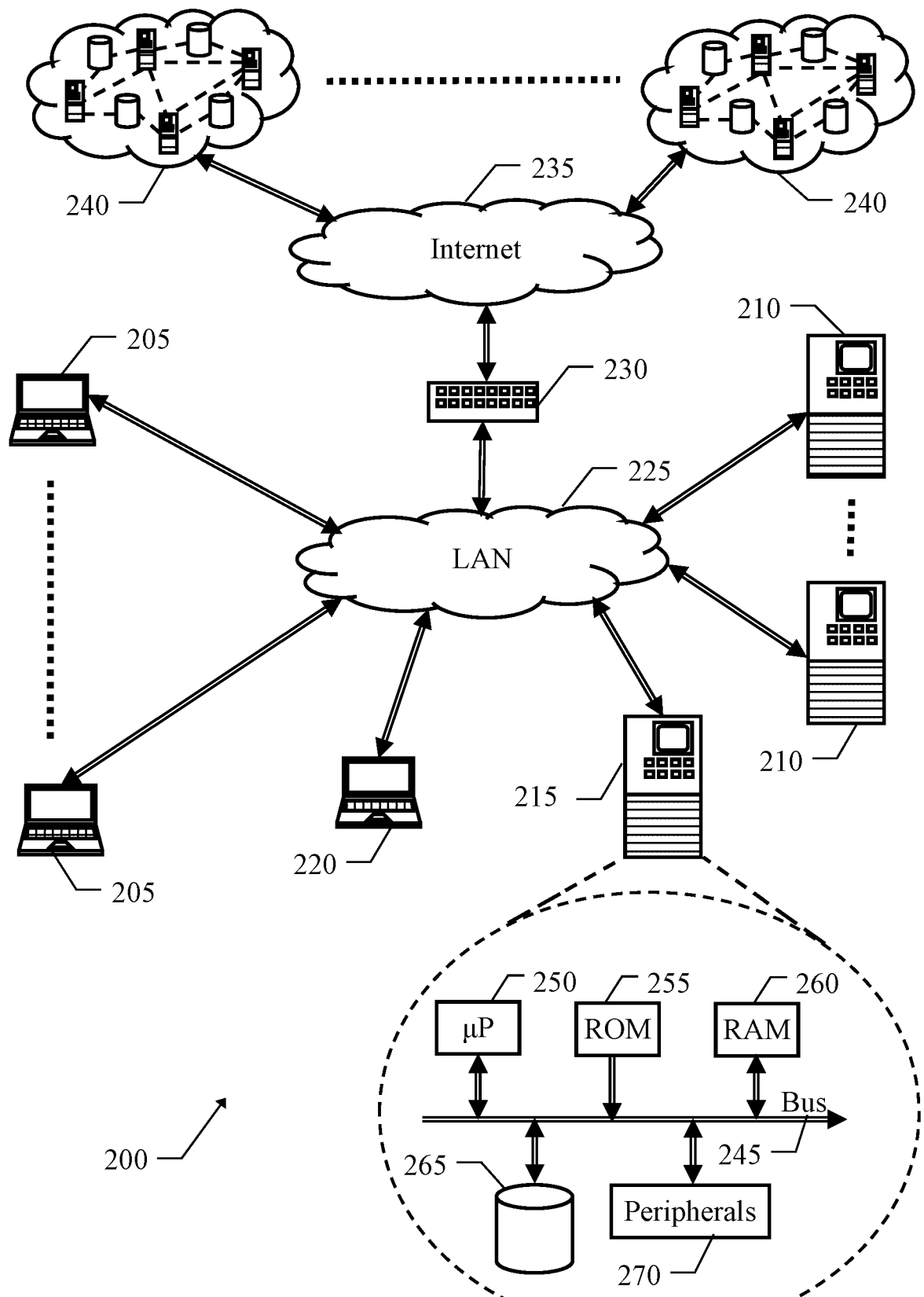
FIG. 2 shows a schematic block diagram of an information technology infrastructure that may be used to implement the embodiment of the present disclosure depicted in FIG. 1A-FIG. 1F.

With reference now to FIG. 2, a schematic block diagram is shown of an information technology infrastructure 200 that may be used to implement the embodiment of the present disclosure depicted in FIG. 1A-FIG. 1F.

A plurality of (user) client computing machines, or simply clients 205 (for example, PCs) are utilized by the users for accessing the software application. One or more (application) server computing machines, or simply servers 210 implement the software application when based on the monolithic architecture (at least in part). A further (control) server 215 controls the accesses to the software application (permitting access only to users of the user clients 205 entitled to do so). A further (control) client 220, or more, is utilized by the supervisor to access the control server 215. The above-mentioned computing machines (e.g., user clients 205, application servers 210, control server 215 and control client 220) communicate over a (telecommunication) network 225, for example, a Local Area Network (LAN).

A router 230 (or more) routes network traffic between the LAN 225 and another (telecommunication) network 235. The router 230 provides connectivity to the Internet for the computing machines 205-220. The user clients 205 access one or more cloud providers 240 via the Internet. Each cloud provider 240 is an entity that provides a pool of computing resources as cloud services (e.g., shared computing resources that may be provisioned, configured and released very rapidly). For this purpose, the cloud provider 240 exposes a frontend sub-system for accessing it (for example, via web browsers of the user clients 205). The frontend sub-system interfaces with a backend sub-system that actually implements the corresponding cloud services (the backend sub-system is not accessible from the outside, so that the users are completely unaware of its location and configuration). The computing resources (generally of the virtual type, e.g., emulations by software of physical computing resources) are provided upon request to the user clients 205, so that each user has the sole control of the computing resources (which may then be used exactly as if they were dedicated to the user). The computing resources may be provided according to several service models, such as, Infrastructure as a Service (IaaS), Platform as a Service (PaaS), Software As a Service (SaaS) and Network as a Service (NaaS). The computing resources may be provided according to different deployment models. Often, there a multi-cloud model (e.g., based on a plurality of cloud providers 240) is adopted, such as a hybrid cloud model (e.g., a combination of different deployment models, such as a public cloud for the general public, a private cloud for a single organization and/or a community cloud for several organizations). In this way, the computing resources are spread over different cloud providers 240, so as to avoid any vendor lock-in. The cloud resources include the micro-services to be used for implementing the software application (the functionalities being migrated thereto from the monolithic architecture). Each micro-service (or any other service) provides a stand-alone functionality, independent of its implementation, which may be requested through a well-defined interface. The micro-service is relatively small in size, fine-grained (to perform a single function), independently deployable and accessible through a lightweight protocol (such as the HTTP).

The control server 215 (used to implement the embodiment of the present disclosure depicted in FIG. 1A-FIG. 1F) includes several units that are connected through a bus structure 245 at one or more levels. For example, a microprocessor (μP) 250, or more, provides a logic capability of the control server 215; a non-volatile memory (ROM) 255 stores basic code for a bootstrap of the control server 215 and a volatile memory (RAM) 260 is used as a working memory by the microprocessor 250. The control server 215 is provided with a mass-memory 265 for storing programs and data (for example, storage devices of a data center wherein the control server 215 is implemented). Moreover, the control server 215 includes a number of controllers for peripherals, or Input/Output (I/O) units, 260. For example, the peripherals 270 include a network card for plugging the control server 215 into the data center and then connecting it to a console of the data center for its control (for example, a personal computer, also provided with a drive for reading/writing removable storage units, such as of USB type) and to a switch/router sub-system of the data center for its communication with the LAN 225.

Figure 3:
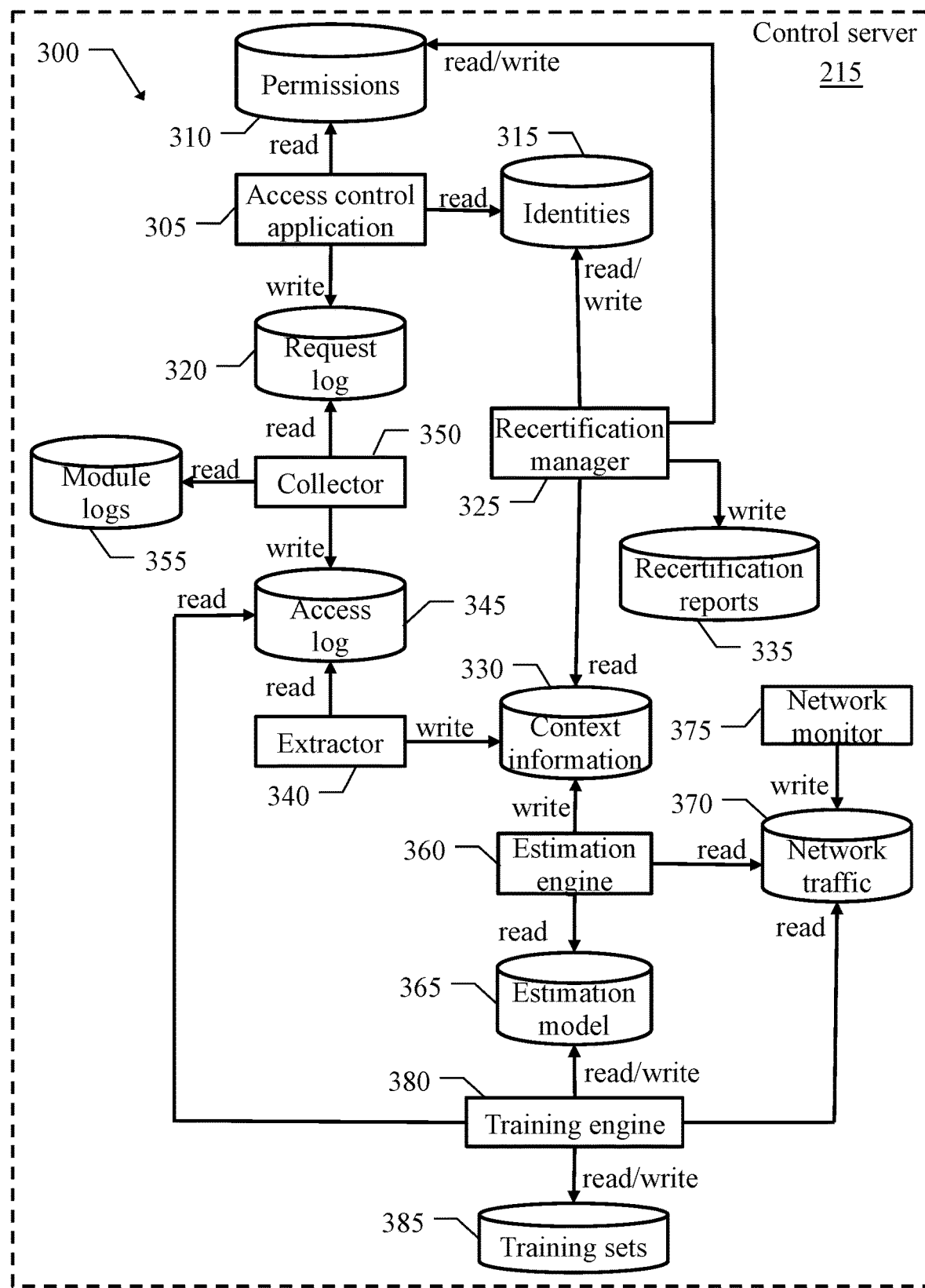
FIG. 3 shows software components that may be used to implement the embodiment of the present disclosure depicted in FIG. 1A-FIG. 1F, FIG. 4-FIG. 5 show corresponding activity diagrams describing the flow of activities relating to an implementation of the embodiment of the present disclosure depicted in FIG. 1A-FIG. 1F.

With reference now to FIG. 3, software components are shown that may be used to implement the embodiment of the present disclosure depicted in FIG. 1A-FIG. 1F.

The software components (programs and data) are denoted as a whole with the reference 300. The software components are typically stored in the mass memory and loaded (at least partially) into the working memory of the control server 215 when the programs are running, together with an operating system and other application programs not directly relevant to the present disclosure (thus omitted in the figure for the sake of simplicity). The programs are initially installed into the mass memory, for example, from removable storage units or from the Internet. In this respect, each program may be a module, segment or portion of code, which includes one or more executable instructions for implementing the specified logical function.

An access control application 305 controls accesses to the resources of the information technology system by the users of the user clients, such as the software application when it is still based on the monolithic architecture (at least in part). A commercial example of the access control application 305 is "IBM Security Identity and Access Manager" by IBM Corporation (trademarks thereof). For this purpose, the access control application 305 (running in the background) intercepts any access request for accessing the software application being submitted by a user logged in his/her user client and allows/prevents it according to the entitlements of the user. For this purpose, the access control application 305 reads from a permission repository 310 and an identity repository 315, which define the access control information (establishing the entitlements of the users to access the software application). When the access control application is based on the RBAC model (defining the entitlements by roles assigned to the users), the permission repository 310 has an entry for each role. The entry indicates one or more permissions that are granted to the role for performing one or more activities in the software application. Alternatively, when the access control application is based on the ABAC model (defining the entitlements by rules based on attributes), the permission repository 310 has an entry for each rule. The entry indicates one or more permissions that are granted for performing one or more activities in the software application when the rule is satisfied. The rule is based on one or more attributes of the resources, the users, the activities and/or a current condition. The identity repository 315 defines the (digital) identities of the users, being used to identify them for operating in the software application. For example, the identity repository 315 has an entry for each user. The entry stores identification information (such as name, department, job and so on) and authentication information (such as account and password). I entry indicates one or more roles assigned to the user (in case of the RBAC model) or one or more attributes of the user (in case of the ABAC model). The access control agent 305 writes to a request log 320. The request log 320 saves (request) log information relating to the access requests to the software application that have been submitted over time (in chronological order). For example, the request log information includes a (log) record for each access request; the log record indicates a time stamp of the access request, the user that has submitted the access request, the type of access that has been requested (for example, activities to be performed and/or resources to be accessed), the information used to determine his/her entitlement (e.g., role in the RBAC model or attributes in the ABAC model) and the result (granted/denied) of the access request.

A recertification manager 325 manages any recertification of the access control information. The recertification manager 325 exposes a Graphical User Interface (GUI) that implements a dashboard for the supervisor. For example, the dashboard outputs corresponding recertification forms for the users whose entitlements have to be recertified. Each recertification form provides information useful for the supervisor to evaluate the entitlements of the user, and corresponding checkboxes for approving/revoking these entitlements (with a possible text box for inserting corresponding notes). For example, the recertification form shows the identification information, the account and the entitlements of the user. Moreover, the recertification form allows the supervisor to view context information relating to the accesses to the software application by the user (either automatically or upon request). The context information provides an insight view of the situation in which the accesses to the software application by the user have occurred. For example, the context information includes the accesses to the software application being made (such as their date/time, user client being utilized and the like), the activities being performed in the software application (such as read/write data, launch programs and the like), the resources being used (such as files, databases, machines, devices and the like) and so on. For example, the context information provides statistics relating to the above-mentioned items (such as number, last one, average duration, frequency and the like). The recertification manager 325 reads/writes to the permission repository 310 and the identity repository 315. The recertification manager 325 reads from a context information repository 330, which stores the context information. The recertification manager 325 also writes to a recertification report repository 335. The recertification report repository 335 stores recertification reports derived from the recertification forms being filled-in by the supervisor (for example, for auditing purposes).

An extractor 340 extracts the context information from (access) log information relating to the accesses to the modules of the software application, when still based on the monolithic architecture (at least in part), by the users. For example, the access log information includes a (log) record for each access to the software application (before its complete migration to the service architecture); the log record indicates a time stamp of the access, its type, the user that has accessed the software application and so on. The extractor 340 writes to the context information repository 330, and it reads from an access log repository 345 storing the access log information. A collector 350 collects the access log information from the request log information and/or from (module) log information relating to operation of the modules of the software application. For example, the module log information of each module includes a (log) record for each event relating to the operation of the module (before its complete migration to the service architecture). The log record indicates a time stamp of the event, a type of the event (such as access to the module, activity being performed, possible warning/error and the like), the user involved in the event and so on. The collector 350 writes to the access log repository 345, and it reads from the request log 320 and one or more module logs 355 storing the module log information (for example, saved by each module or by the whole software application, either locally or on a centralized log server).

According to an embodiment of the present disclosure, an estimation engine 360 estimates the context information relating to the accesses by the users to the micro-services implementing the software application when based on the service architecture (at least in part). For example, the estimation engine 360 is implemented by a machine learning engine. Basically, machine learning is a technique used to perform a specific task (in this case, estimating the context information from the network traffic information) without using explicit instructions but inferring how to do so automatically from examples. For this purpose, the machine learning engine may implement a Random Forest (RF) classifier. In general, a classifier is used to classify each acquisition of information (observation) by identifying to which one of a discrete set of disjoint categories (classes) the observation belongs. In this case, the classes are pre-defined types of the context information and the observations are pieces of the network traffic information. For example, the types of the context information are access to the software application, user client being utilized, data being read/written, program being launched, file, database, machine or device being used and so on. When it is possible, the network traffic information is based on a content of (network) packets carried over the Internet as formatted units of data (such as their headers and payloads). More generally (such as when the network traffic is encrypted), the network traffic information is based on a flow of the packets sharing common characteristics (such as exchanged between a same user client and a same cloud provider). In this case, the network traffic information includes statistics relating to the transmission of the packets, such as their size, inter-arrival time elapsed between two consecutive packets, round-trip time between an outgoing packet and a corresponding ingoing packet, used ports, upload/download rates and so on. The random forest classifier uses an ensemble method (based on multiple learning algorithms), and multiple decision trees to classify each observation into the class selected by most of the decision trees. The estimation engine 360 reads from an estimation model repository 365, which stores an estimation model defining a configuration of the estimation engine 360 (the decision trees of the random forest classifier in the example at issue). The estimation engine 360 reads from a network traffic repository 370, which stores the network traffic information, and it writes to the context information repository 330. A network monitor 375 monitors the network traffic over the Internet for collecting the network traffic information. For example, the network monitor 375 collects the network traffic information continually from the router. The network monitor 375 writes to the network traffic repository 370. A training engine 380 trains the estimation engine 360 by (incrementally) learning its estimation model from the access log information and the network traffic information. For example, the training is performed in a supervised way by means of a batch of training sets, each formed by a record of the access log information and a corresponding piece of the network traffic information. The training engine 380 reads from the access log repository 345 and the network traffic repository 370. The training engine 380 reads/writes to the estimation model repository 365 and a training set repository 385 (which stores the training sets).

Figure 4:
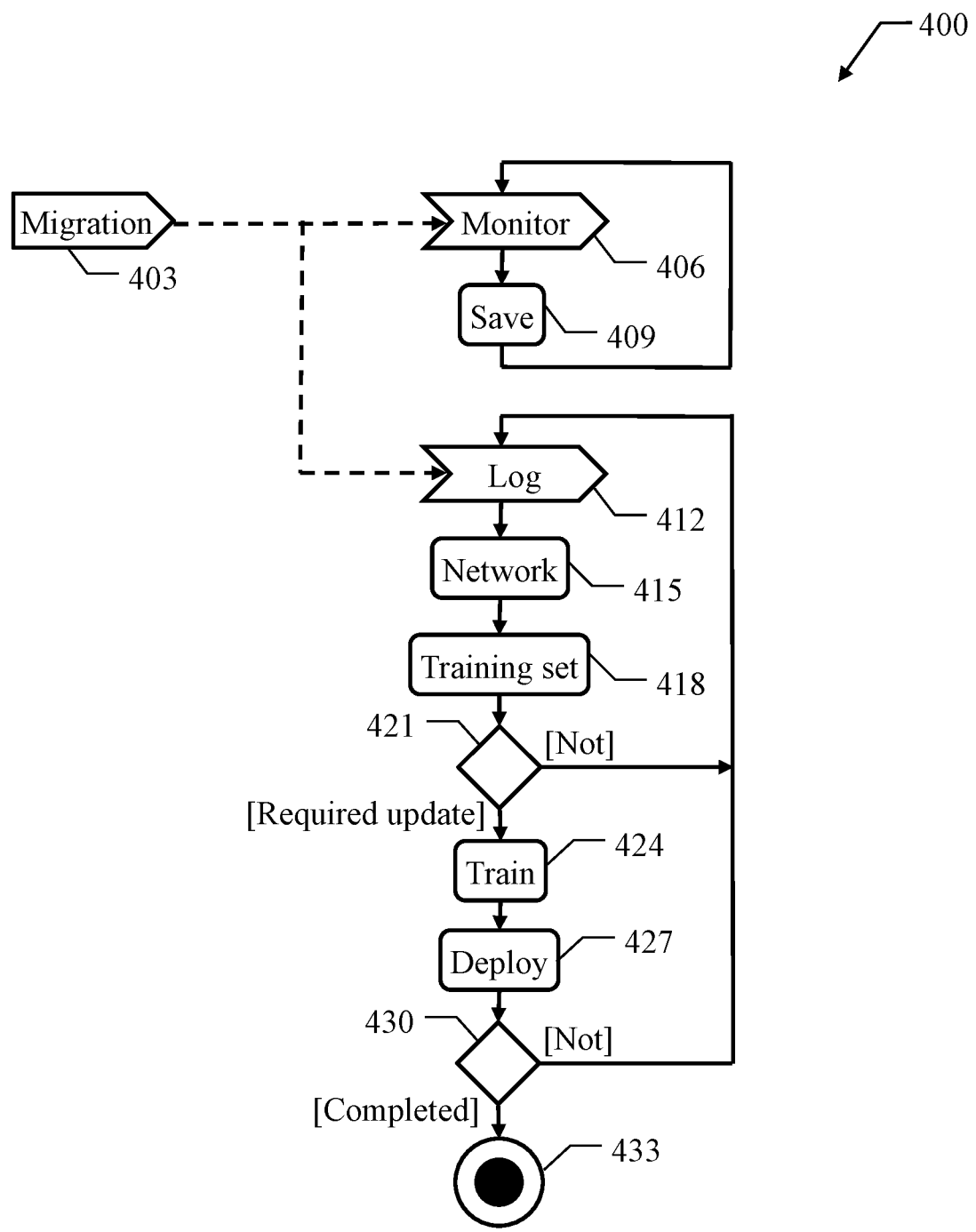
Figure 5:
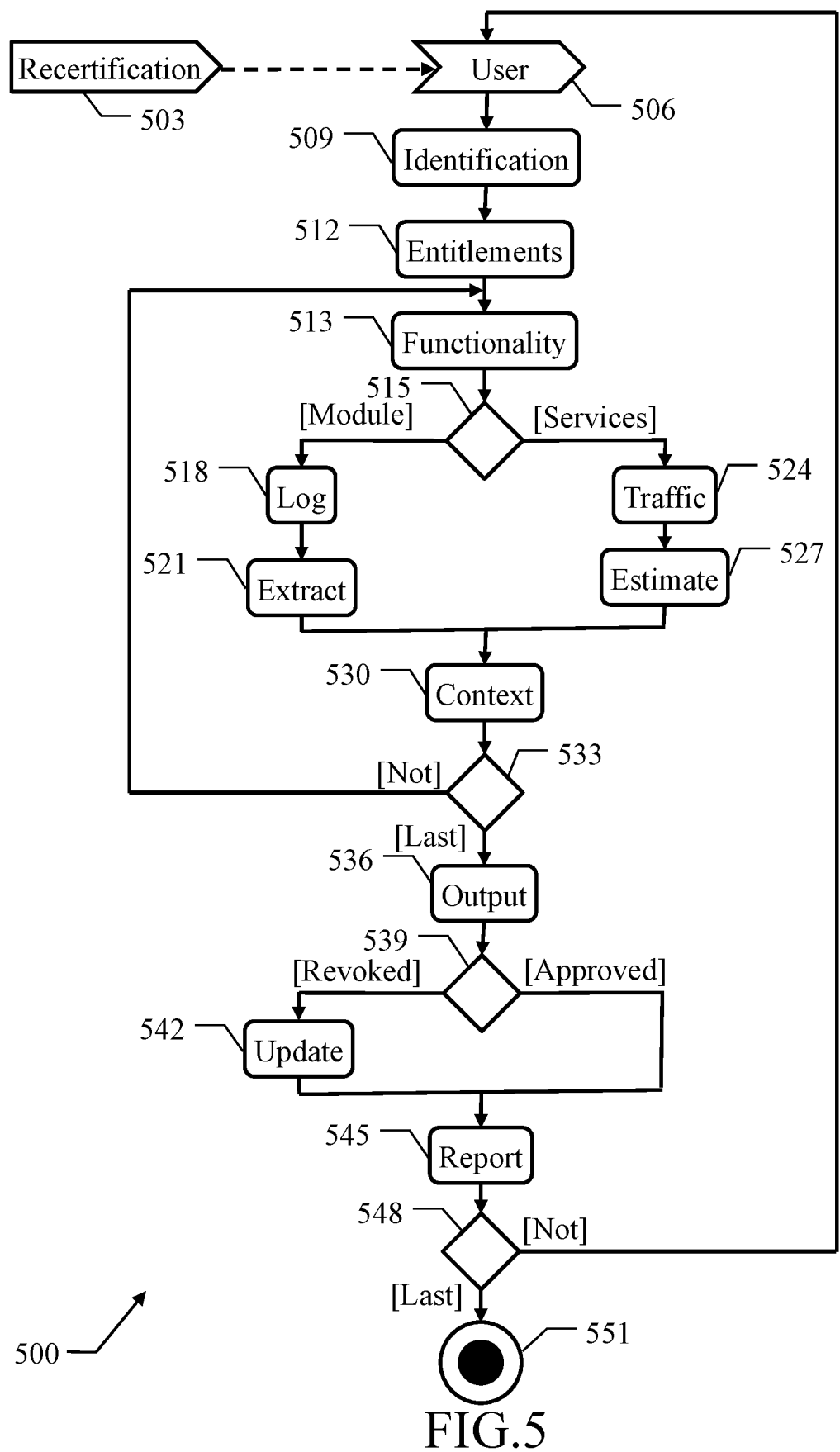

With reference now to FIG. 4-FIG. 5, corresponding activity diagrams are shown describing the flow of activities relating to an implementation of the embodiment of the present disclosure depicted in FIG. 1A-FIG. 1F. Each block may correspond to one or more executable instructions for implementing the specified logical function by the control server.

Starting from FIG. 4, the diagram represents an exemplary process that may be used to configure the estimation engine (during a migration of the software application from the monolithic architecture to the service architecture) with a method 400.

The migration is performed with the "strangler" pattern. For this purpose, at first a strangler façade is added to the software application for routing all the access requests submitted thereto by the users (the strangler façade is initialized to route all the access requests to the modules of the software application, so that it operates as usual). The migration is then performed with (migration) phases in succession for the modules. In each migration phase a module is selected (for example, starting from the ones being simpler, better suited for the cloud environment, more dynamic and so on) and a group of micro-services providing the same functionality of the (selected) module are developed. Once these micro-services are ready, the strangler façade is configured to route all the access requests to both the module and the micro-services while they co-exist. This allows testing the micro-services, to ensure that they actually provide the same functionality of the module. Once the micro-services have been successfully tested, the strangler façade is configured to route all the requests addressed to the module only to the micro-services, so that the module may be decommissioned. The same operations are then performed for the other modules in succession. The software application thus shrinks during the migration phases up to when all its modules have been replaced by the corresponding groups of micro-services implementing its whole function. At this point, the software application (e.g., what possibly remains of it so "strangled") may be decommissioned, together with its strangler façade. From then on, all the access requests of the users are submitted directly to the micro-services over the telecommunication network.

The process passes from block 403 to block 406 in response to the start of the migration. At this point, the network monitor starts monitoring the network traffic over the Internet (for example, following a corresponding command entered manually). For this purpose, the network monitor retrieves a new piece of the network traffic information from the router (for example, by sending a corresponding request to the router periodically for causing it to return the piece of network traffic information saved after a previous request). In this way, the network traffic is monitored at an edge of the LAN, without requiring any intervention on the user clients. The network monitor at block 409 adds this piece of network traffic information to the corresponding repository. The process then returns to the block 406 to repeat the same operations continuously.

The process further passes from the block 403 to block 412 in response to the beginning of the migration of the software application. The training engine starts populating the training set repository (initially empty). The training engine scans the access log repository to retrieve a (new) log record therefrom (for an action relating to the access to the software application). The training engine at block 415 then retrieves a piece of the network traffic information (from the corresponding repository). The piece of network traffic information corresponds to the log record (for example, for the network traffic of the user client of the user involved in the action of the log record over a pre-determined period around its time-stamp). The training engine at block 418 then generates a (new) training set (formed by using the log record and the piece of traffic information) and adds it to the corresponding repository. The training engine at block 421 verifies whether an update of the configuration of the estimation model is required. The estimation model is updated whenever a (new) group of micro-services is replacing the corresponding module and after completing the test of the micro-services in co-existence with the module. The estimation model is configured to recognize a pattern of the network traffic corresponding to the invocation of the micro-services. The estimation model is also updated at the beginning of the migration once the test of a first group of micro-services starts; the estimation model is configured to recognize the pattern of the network traffic corresponding to the operation of the software application still completely based on the monolithic architecture. As a result, the estimation engine is initialized accordingly thereby reducing the complexity of its configuration for the first group of micro-services as well. If no update of the configuration of the estimation model is required, the process returns to the block 412 to repeat the same operation continually.

Conversely (e.g., at the beginning of the test of the first group of micro-services or after the completion of the test of each group of micro-services) the training engine at block 424 trains the estimation engine with the batch of training sets stored in the corresponding repository. The training engine updates the estimation model for recognizing the pattern of the network traffic corresponding to no invocation of micro-services or to the invocation of the corresponding group of micro-services (at the beginning of the test of the first group of micro-services or after the completion of the test of each group of micro-services, respectively). For example, in the case of the random forest classifier, samples are generated by applying a bootstrap aggregation, or bagging, technique (wherein the training sets are selected randomly with replacement) and a feature bagging technique (wherein subsets of features are selected randomly when splitting nodes of the trees), and the trees are then fitted to these samples. Once the estimation engine has been trained (and tested on other training sets for its capability of generalization), the training engine at block 427 deploys the (updated) estimation model so obtained (at the same time purging the network traffic repository for its next use). Therefore, in case the training has been performed after the completion of the test of a group of micro-services, from then on the estimation of the context information relating to this group of micro-services from the network traffic information replaces its extraction from the access log information relating to the corresponding module. The training engine at block 430 verifies whether all the modules have been migrated to the corresponding groups of micro-services. If not, the process returns to the block 412 to repeat the same operations for the group of micro-services corresponding to a next module still to be migrated. Conversely (once the migration of the software application has been completed) the process ends at the concentric black and white circles 433.

Moving to FIG. 5, the diagram represents an exemplary process that may be used to recertify the access control information with a method 500.

The process passes from block 503 to block 503 whenever a recertification of the access control information is required (for example, according to corresponding policies, periodically, in case of a reorganization, acquisition or outsourcing operation, in case of regulatory modifications, in case of an audit and so on). A loop is then entered, wherein the recertification manager takes a (current) user into account (starting from a first one in any arbitrary order as indicated in the identity repository), and it initializes a (new) recertification form for him/her. The recertification manager at block 509 retrieves the identification information of the user from the corresponding repository and adds it to the recertification form. The recertification manager at block 512 retrieves the entitlements of the user from the corresponding repositories (for example, from the permissions of the roles assigned to the user or from the permissions of the rules based on the attributes of the user) and adds it to the recertification form.

A further loop is entered at block 513, wherein the recertification manager takes a (current) functionality of the software application into account (starting from a first one in any arbitrary order). The flow of activity branches at block 515 according to an implementation of the functionality of the software application. If the functionality is implemented by a module of the software application (still to be migrated), the extractor at block 518 retrieves the access log information from the corresponding repository relating to the accesses to the module by the user (for example, in the last 3-12 months). The extractor at block 521 extracts the context information relating to the accesses to the module by the user from this access log information, and it adds the context information so obtained to the corresponding repository. Referring back to the block 515, if the functionality is implemented by a group of micro-services (already migrated), the estimation engine at block 524 retrieves the network traffic information from the corresponding repository relating to the invocations of the micro-services by the user (for example, again in the last 3-12 months). The estimation engine at block 527 estimates the context information relating to the invocations of the micro-services by the user from this network traffic information (according to the estimation model), and it adds the context information so obtained to the corresponding repository. The flow of activity merges again at block 530 from either the block 521 or the block 527. In both cases, the recertification manager now retrieves the context information relating to the access to the functionality of the software application by the user (irrespective of its implementation) from the corresponding repository, and adds it to the recertification form. The recertification manager at block 533 verifies whether a last functionality of the software application has been processed. If not, the flow of activity returns to the block 512 to repeat the same operations for a next functionality of the software application. Conversely (once all the functionalities of the software application have been processed) the loop exits by descending into block 536.

At this point, the recertification form of the user is complete and it may be displayed in the dashboard of the recertification manager at any time (for example, automatically in succession or upon request by the supervisor). The supervisor is then prompted to recertify the entitlements of the user indicated in the recertification form, with the help of the corresponding context information (for example, made available to the supervisor either automatically or upon request in a pop-up window). The flow of activity branches at block 539 according to the recertification of the entitlements, as indicated by the selection of the corresponding approve/revoke checkboxes by the supervisor. If one or more entitlements have been revoked, the recertification manager at block 542 updates the access control information accordingly. The process then descends into block 545. The same point is also reached directly from the block 539 if all the entitlements of the users have been approved. At this point, the recertification manager generates the corresponding recertification report (containing the identification information of the user, its entitlements, their approval/revocation and the context information supporting their recertification) and adds it to the corresponding repository. The recertification manager at block 548 verifies whether a last user has been processed. If not, the flow of activity returns to the block 506 to repeat the same operations for a next user. Conversely (once all the users have been processed) the loop exited with the process that ends at the concentric black and white circles 551.

In order to satisfy local and specific requirements, a person skilled in the art may apply many logical and/or physical modifications and alterations to the present disclosure. Although this disclosure has been described with a certain degree of particularity with reference to one or more embodiments thereof, it should be understood that various omissions, substitutions and changes in the form and details as well as other embodiments are possible. Particularly, different embodiments of the present disclosure may be implemented even without the specific details (such as the numerical values) set forth in the preceding description to provide a more thorough understanding thereof. Conversely, well-known features may have been omitted or simplified in order to avoid obscuring the description with unnecessary particulars. Specific elements and/or method steps described in connection with any embodiment of the present disclosure may be incorporated in any other embodiment as a matter of general design choice. Items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (e.g., not limited to the recited items), the terms based on, dependent on, according to, function of and the like should be intended as a non-exclusive relationship (e.g., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for facilitating a recertification of access control information. However, the access control information may be of any type (for example, based on roles and assignments for a RBAC model, rules and attributes for an ABAC model, tables for an Access Control List (ACL) model, and so on). The recertification may be of any type (for example, a recertification campaign triggered by partial, different and/or additional events with respect to the ones mentioned above, a specific recertification of one or more subjects, and so on) and for any purpose (for example, updating, reporting, auditing and so on).

In an embodiment, the access control information is for controlling accesses to a software application. However, the accesses may be of any type (for example, enabling/denying every activity, requesting further actions, such as entering a second level password, to enable specific activities, and so on) and to any type of software application (for example, providing any number and type of functionalities, being partial, different and/or additional with respect to the ones mentioned above, and so on).

In an embodiment, the method includes the following steps under the control of a computing system. However, the computing system may be of any type (see below).

In an embodiment, the method includes collecting (by the computing system) network traffic information. However, the network traffic information may be of any type (for example, based on contents, flows, such as comprising partial, different and/or additional statistics with respect to the ones mentioned above, and so on).

In an embodiment, the network traffic information is collected by monitoring a network traffic of the subjects. However, the network traffic may be monitored in any way (for example, on one or more routers, gateways, on the user clients and so on).

In an embodiment, the network traffic is on a telecommunication network. However, the telecommunication network may be of any type (for example, a global, local, wide area network, utilizing any type of wired and/or wireless connections, such as of metal wire, optical fiber, Wi-fi, mobile telephone or satellite type, and so on).

In an embodiment, the method includes estimating (by the computing system) at least part of context information relating to the accesses to the software application by the subjects. However, the context information may be of any type (for example, comprising partial, different and/or additional pieces of information with respect to the ones mentioned above) and it may be estimated for any number of functionalities of the software application (for example, all of them, only part of them and so on).

In an embodiment, the context information is estimated from the network traffic information. However, the context information may be estimated in any way (for example, with machine learning, artificial intelligence, fuzzy logic, classification algorithm and so on techniques).

In an embodiment, the context information is estimated for the accesses relating to invocations of one or more services contributing at least in part to implement the software application. However, the services may be in any number and of any type (for example, cloud services, web services, standard/micro services and so on) and they may contribute to implement the software application to any extent (for example, completely, only in part and so on).

In an embodiment, the method includes outputting (by the computing system) the context information for supporting the recertification of the access control information. However, the context information may be output in any way (for example, displayed, such as on a monitor of the computing system or of a control client used to access it, printed, transmitted remotely and so on).

Further embodiments may provide additional advantageous features, which may be omitted in a basic implementation.

For example, in an embodiment, the method includes configuring (by the computing system) an estimation engine for estimating the context information in response to a migration of the software application. However, the estimation engine may be of any type (for example, based on an separate estimation model, self-contained, such as in case of a neural network, and so on) and it may be configured in any way (for example, incrementally during the migration, as a whole at the end of the migration and so on). The possibility is not excluded of configuring the estimation engine even independently of any migration of the software application (for example, during a test of the software application when it is created ex novo).

In an embodiment, the migration is from a source architecture based on a plurality of modules to a target architecture based on corresponding groups of one more services accessible over the telecommunication network. However, the modules may be in any number and of any type (for example, partial, different and/or additional modules with respect to the ones mentioned above), each replaced by any number and type of services (see above).

In an embodiment, the estimation engine is configured according to log information relating to accesses to the modules by the subjects and to the corresponding network traffic information. However, the estimation engine may be configured in any way (for example, with training, analysis and so on techniques) according to any log information (for example, collected by each module individually, centrally for the whole software application and so on). In any case, the possibility is not excluded of configuring the estimation engine in a different way, even independently of any migration (for example, according to test cases applied during a test of the software application and to the corresponding network traffic information).

In an embodiment, the method includes configuring (by the computing system) the estimation engine incrementally in response to each of a plurality of migration phases of the migration from a corresponding one of the modules to the corresponding group of services. However, the estimation engine may be configured incrementally in any way (for example, for each module, group of two or more modules and so on).

In an embodiment, the estimation engine is configured according to the log information relating to the accesses to the module by the subjects and to the corresponding network traffic information. However, the estimation engine may be configured for the group of services corresponding to the module in any way (for example, during their co-existence, during an offline test of the services and so on).

In an embodiment, the method includes configuring (by the computing system) the estimation engine incrementally in response to each migration phase during a co-existence period of the corresponding module and the corresponding group of services. However, the co-existence period may have any duration and purpose (for example, for testing the services, verifying their performance, only for collecting training sets of the estimation engine and so on).

In an embodiment, the method includes initializing (by the computing system) the estimation engine according to the log information relating to the accesses to the modules by the subjects and to the corresponding network traffic information before the migration. However, this information may be collected during any period and at any time (for example, during the development of the group of services corresponding to the first module to be migrated, before the migration and so on).

In an embodiment, the method includes estimating (by the computing system) the context information during the migration in part with the estimation engine from the network traffic for the groups of services already migrated and in part from the corresponding log information for the modules still to be migrated, and after the migration only with the estimation engine from the network traffic. However, the context information may be estimated from the network traffic information at any time (for example, during any phase of the migration, only after the migration and so on).

In an embodiment, the estimation engine is a machine learning engine. However, the machine learning engine may be of any type (for example, based on a random forest classifier, a neural network, an artificial immune system, a clustering-based technique and so on).

In an embodiment, the method includes generating (by the computing system) a plurality of training sets from the log information and the corresponding network traffic information. However, the training sets may be in any number and of any type (for example, for each relevant record of the log information, for the records of the log information being filtered/sub-sampled and so on).

In an embodiment, the method includes training (by the computing system) the machine learning engine with the training sets. However, the estimation engine may be trained in any way (for example, based on bagging, stochastic gradient descent, real-time recurrent learning and so on techniques).

In an embodiment, the method includes collecting (by the computing system) the network traffic information by monitoring the network traffic on one or more routing devices routing the network traffic between corresponding client computing machines of the subjects and the telecommunication network. However, the routing devices may be in any number and of any type (for example, of access, core, distribution and so on type) for routing the network traffic relating to any number and type of client computing machines (for example, desktops, laptops, tablets, smartphones and so on).

In an embodiment, the services are micro-services. However, the micro-services may be of any type (for example, normal micro-services, nano-services and so on).

In an embodiment, the services are implemented in a cloud environment. However, the cloud environment may be of any type (for example, multi-cloud, hybrid-cloud, basic-cloud and so on).

In an embodiment, the services are implemented by a plurality of cloud providers. However, the cloud providers may be in any number and of any type (for example, public, private, community and so on cloud providers).

In an embodiment, the method includes receiving (by the computing system) recertification information resulting from the recertification of the access control information. However, the recertification information may be of any type (for example, approval/revocation of the entitlements, notes relating to reasons of the decisions and so on) and it may be provided in anyway (for example, entered locally, transmitted remotely, with individual/aggregated reports and so on).

In an embodiment, the method includes updating (by the computing system) the access control information according to the recertification information. However, the access control information may be updated in any way (for example, for preventing unauthorized accesses, deleting stale permissions, removing dormant/orphan subjects and so on).

Generally, similar considerations apply if an embodiment is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a computing system to perform the method of above when the computer program is executed on the computing system. An embodiment provides a computer program product that includes one or more computer readable storage media having program instructions collectively stored in said one or more computer readable storage media, the program instructions readable by the computing system to cause the computing system to perform the same method. However, the program may be implemented as a stand-alone module, as a plug-in for a pre-existing program (for example, the access control application) or even directly in the latter. The program may take any form suitable to be used by any computing system (see below).

An embodiment provides a system comprising means that are configured for performing the steps of the above-described method. An embodiment provides a system comprising a circuitry (e.g., any hardware suitably configured, for example, by software) for performing each step of the same method. However, the system may be of any type (for example, a server, a virtual machine, a desktop and so on).

Generally, similar considerations apply if the system has a different structure or includes equivalent components or it has other operative characteristics. In any case, every component thereof may be separated into more elements, or two or more components may be combined together into a single element. Each component may be replicated to support the execution of the corresponding operations in parallel. Unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
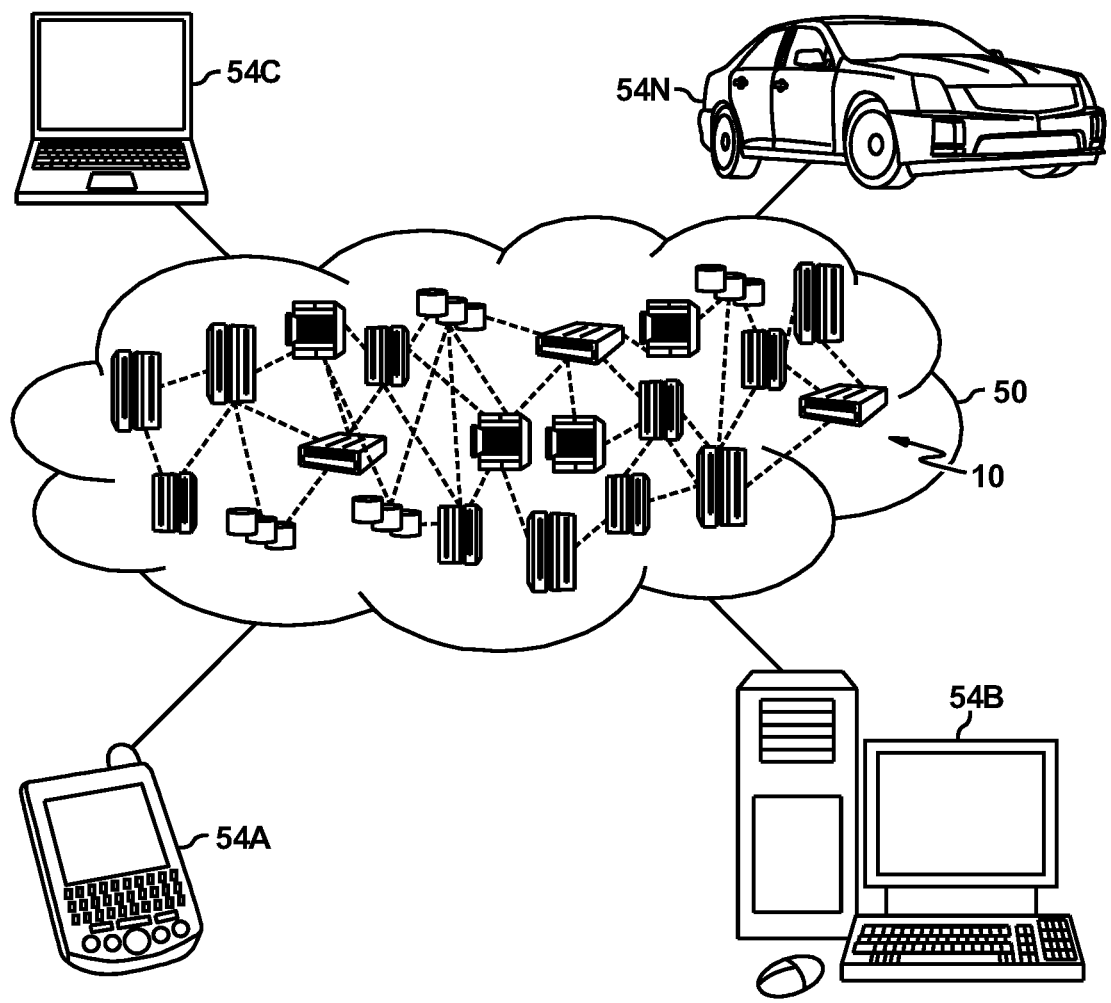
FIG. 6 depicts a cloud computing environment according to an embodiment of the present disclosure.

With reference now to FIG. 6, a cloud computing environment is depicted according to an embodiment of the present disclosure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
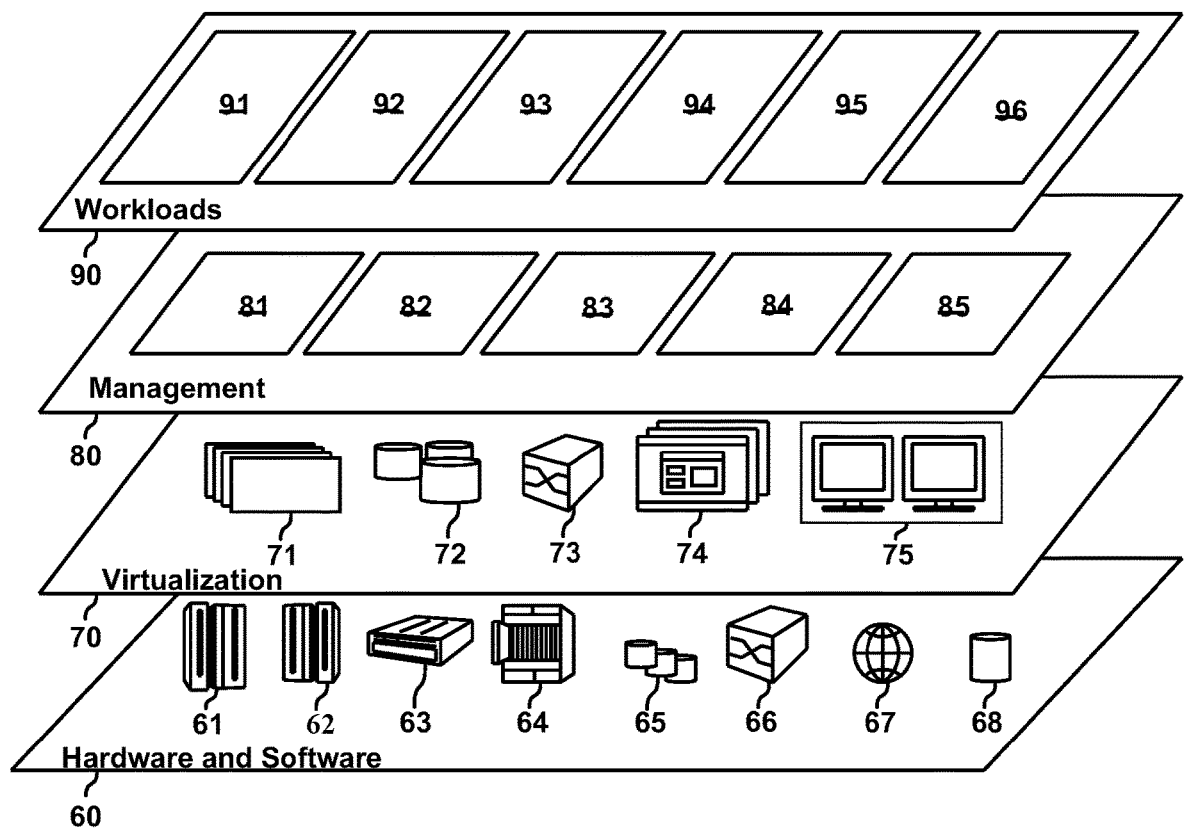
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and recertification management 96.

What is claimed is:

1. A method for facilitating a recertification of access control information for controlling accesses to a software application by a plurality of subjects, wherein the method comprises, under control of a computing system:
    collecting, by the computing system, network traffic information by monitoring a network traffic of the subjects over a telecommunication network;
    configuring, by the computing system, an estimation engine for estimating context information, wherein the estimation engine is configured according to log information relating to accesses to modules by the subjects and to corresponding network traffic information;
    estimating, by the computing system, at least part of the context information relating to the accesses to the software application by the subjects from the network traffic information for the accesses relating to invocations over the telecommunication network of one or more services contributing at least in part to implement the software application; and
    outputting, by the computing system, the context information for supporting the recertification of the access control information.

2. The method according to claim 1, wherein the configuring the estimation engine for estimating the context information is in response to a migration of the software application from a source architecture based on a plurality of modules to a target architecture based on corresponding groups each of one more services accessible over the telecommunication network.

3. The method according to claim 2, further comprising:
    configuring, by the computing system, the estimation engine incrementally in response to each of a plurality of migration phases of the migration from a corresponding one of the modules to the corresponding group of services according to the log information relating to the accesses to the module by the subjects and to the corresponding network traffic information.

4. The method according to claim 3, further comprising:
    configuring, by the computing system, the estimation engine incrementally in response to each migration phase during a co-existence period of the corresponding module and the corresponding group of services.

5. The method according to claim 4, further comprising:
    initializing, by the computing system, the estimation engine according to the log information relating to the accesses to the modules by the subjects and to the corresponding network traffic information before the migration.

6. The method according to claim 2, further comprising:
    estimating, by the computing system, the context information during the migration in part with the estimation engine from the network traffic for groups of services already migrated and in part from the corresponding log information for modules still to be migrated, and after the migration only with the estimation engine from the network traffic.

7. The method according to claim 2, wherein the estimation engine is a machine learning engine.

8. The method according to claim 7, further comprising:
    generating, by the computing system, a plurality of training sets from the log information and the corresponding network traffic information; and
    training, by the computing system, the machine learning engine with the training sets.

9. The method according to claim 1, further comprising:
    collecting, by the computing system, the network traffic information by monitoring the network traffic on one or more routing devices routing the network traffic between corresponding client computing machines of the subjects and the telecommunication network.

10. The method according to claim 1, wherein the services are micro-services.

11. The method according to claim 1, wherein the services are implemented in a cloud environment.

12. The method according to claim 11, wherein the services are implemented by a plurality of cloud providers.

13. The method according to claim 1, further comprising:
    receiving, by the computing system, recertification information resulting from the recertification of the access control information; and
    updating, by the computing system, the access control information according to the recertification information.

14. A computer program product for facilitating a recertification of access control information for controlling accesses to a software application by a plurality of subjects, the computer program product comprising one or more computer readable storage media having program instructions collectively stored in said one or more computer readable storage media, the program instructions readable by a computing system to cause the computing system to perform a method comprising:
    collecting network traffic information by monitoring a network traffic of the subjects over a telecommunication network;

configuring, by the computing system, an estimation engine for estimating context information, wherein the estimation engine is configured according to log information relating to accesses to modules by the subjects and to corresponding network traffic information;

estimating at least part of the context information relating to the accesses to the software application by the subjects from the network traffic information for the accesses relating to invocations over the telecommunication network of one or more services contributing at least in part to implement the software application; and outputting the context information for supporting the recertification of the access control information.

15. The computer program product according to claim 14, wherein the configuring the estimation engine for estimating the context information is in response to a migration of the software application from a source architecture based on a plurality of modules to a target architecture based on corresponding groups each of one more services accessible over the telecommunication network.

16. The computer program product according to claim 15, further comprising:

configuring, by the computing system, the estimation engine incrementally in response to each of a plurality of migration phases of the migration from a corresponding one of the modules to the corresponding group of services according to the log information relating to the accesses to the module by the subjects and to the corresponding network traffic information.

17. The computer program product according to claim 16, further comprising:

configuring, by the computing system, the estimation engine incrementally in response to each migration phase during a co-existence period of the corresponding module and the corresponding group of services.

18. The computer program product according to claim 17, further comprising:

initializing, by the computing system, the estimation engine according to the log information relating to the accesses to the modules by the subjects and to the corresponding network traffic information before the migration.

19. The computer program product according to claim 15, further comprising:

estimating, by the computing system, the context information during the migration in part with the estimation engine from the network traffic for groups of services already migrated and in part from the corresponding log information for modules still to be migrated, and after the migration only with the estimation engine from the network traffic.

20. A system for facilitating a recertification of access control information for controlling accesses to a software application by a plurality of subjects, wherein the system comprises:

a monitor for collecting network traffic information by monitoring a network traffic of the subjects over a telecommunication network;

an estimation engine for estimating at least part of context information relating to the accesses to the software application by the subjects from the network traffic information for the accesses relating to invocations over the telecommunication network of one or more services contributing at least in part to implement the software application, wherein the estimation engine is configured according to log information relating to accesses to modules by the subjects and to corresponding network traffic information;

a configuration component for configuring the estimation engine for estimating the context information; and an output unit for outputting the context information for supporting the recertification of the access control information.

* * * * *